United States Patent [19]

Takano et al.

[11] Patent Number: 4,665,846
[45] Date of Patent: May 19, 1987

[54] INPUT DEVICE FOR SEWING MACHINE

[75] Inventors: Kunio Takano, Tokyo; Masanori Nukushina, Kanagawa; Toshiyuki Miyamoto, Tokyo, all of Japan

[73] Assignee: Tokyo Juki Industrial Co. Ltd., Tokyo, Japan

[21] Appl. No.: 758,658

[22] Filed: Jul. 24, 1985

[30] Foreign Application Priority Data

Jul. 31, 1984 [JP] Japan ................................ 59-160779

[51] Int. Cl.$^4$ ........................................... D05B 21/00
[52] U.S. Cl. ................................................ 112/121.12
[58] Field of Search .................... 112/121.12, 121.11, 112/456, 453, 457, 266.1, 102, 103, 104, 262.3; 364/400, 470

[56] References Cited

U.S. PATENT DOCUMENTS

| | | | |
|---|---|---|---|
| 4,309,950 | 1/1982 | Franklin | 112/121.12 X |
| 4,413,574 | 11/1983 | Hirota et al. | 112/456 X |
| 4,444,134 | 4/1984 | Maruyama et al. | 112/121.12 |
| 4,520,745 | 6/1985 | Shinomiya et al. | 112/266.1 |
| 4,572,095 | 2/1986 | Makabe et al. | 112/456 |
| 4,610,210 | 9/1986 | Kinoshita et al. | 112/121.12 |

Primary Examiner—Peter Nerbun
Attorney, Agent, or Firm—Tarolli, Sundheim & Covell

[57] ABSTRACT

An input device for sewing machines is disclosed which reads from a memory circuit an original sewing pattern which has been already stored, enlarging or reducing the coordinate data of the original sewing pattern in a desired scale, and prepare the coordinate data of sewing points between the flexing points thus obtained by enlargement or reduction in accordance with a desired stitch length data or stitch number data. The input device is adapted to convert the coordinate data of the original sewing pattern to the coordinate data calculated with the central point of a crank member of a work holder with the crank member as the origin and enlarge or reduce the coordinate data of the flexing points other than the starting point and the ending point of sewing in a desired scale, when the original sewing pattern is for a work holder with a crank member.

6 Claims, 8 Drawing Figures

INPUT DEVICE FOR SEWING MACHINE

BACKGROUND OF THE INVENTION

The present invention relates to an input device for sewing machines which performs program control of sewing patterns and, more particularly, to an input device which uses sewing patterns previously stored in a memory to input patterns similar to the stored sewing patterns.

A sewing machine has been heretofore known which sews in desired patterns by moving a work holder for holding a workpiece by means of a pulse motor in accordance with corresponding coordinate data which have previously been stored in a memory such as magnetic tape, magnetic card and floppy. However, a sewing machine of this type has not been capable of making from sewing patterns which have already been stored in a memory sewing patterns similar to the stored sewing patterns. Therefore, this type of a sewing machine is disadvantageous in that when the similar patterns are to be inputted, these patterns must be drawn on a digitizer by means of an indicating pen or must be drawn on a CRT by means of a light pen. Furthermore, when this type of a sewing machine is used to sew appliqué or emblems on a workpiece, a so-called work holder with a crank or force transmitting member is used. This type of a sewing machine is disadvantageous in that the use of this work holder with a crank or force transmitting member requires a certain relationship between the crank member of the work holder and the starting point of sewing or the end point of sewing which may complicate the preparation of sewing patterns.

SUMMARY OF THE INVENTION

It is therefore an object of the present invention to provide an input device which can make from sewing patterns previously stored in a memory sewing patterns similar to the stored sewing patterns so that the efficiency of preparation of similar sewing patterns is improved with the accuracy of the patterns maintained, even when a sewing machine with a work holder with a crank or force transmitting member is used.

The above and other objects of the present invention will become more apparent from the following detailed description and examples.

The present invention provides a means for reading original sewing patterns which have already been stored, a means for enlarging or reducing coordinate data of flexing points along the original sewing patterns in a desired scale, and a means for preparing coordinate data of sewing points between these flexing points in accordance with desired sewing length data. Furthermore, a sewing machine with a work holder with a crank or force transmitting member is further provided with a means for enlarging or reducing coordinate data of flexing points other than the starting point of sewing and the end point of sewing in a desired scale by converting the coordinate data of the original sewing patterns into coordinate patterns calculated with the center of the crank member as the origin.

The input device of the present invention is adapted to read original sewing patterns which have already been stored, enlarge or reduce the coordinate data of the flexing points along the patterns thus read in a desired scale, and prepare coordinate data of sewing points between these flexing points thus modified in accordance with a desired sewing length data or needle number data. In a sewing machine with a work holder with a crank or force transmitting member, the input device is adapted to enlarge or reduce coordinate data of flexing points other than the starting point of sewing and the end point of sewing in a desired scale by converting the coordinate data of the original sewing patterns into coordinate patterns calculated with the center of the crank member as the origin.

Therefore, the input device of the present invention is effective in that it can automatically make sewing patterns similar to the original sewing patterns without drawing the similar patterns on a digitizer or CRT, that it provides a remarkably improved efficiency of preparation of sewing patterns, and that it enables a sewing machine with a work holder with a crank member to automatically make sewing patterns similar to the original patterns.

BRIEF DESCRIPTION OF THE DRAWINGS

In the accompanying drawings, there are shown illustrative embodiments of the invention from which these and other of its objectives, novel features, and advantages will be readily apparent.

In the drawings.

DETAILED DESCRIPTION OF THE PREFERRED EMBODIMENTS

Figure 1:
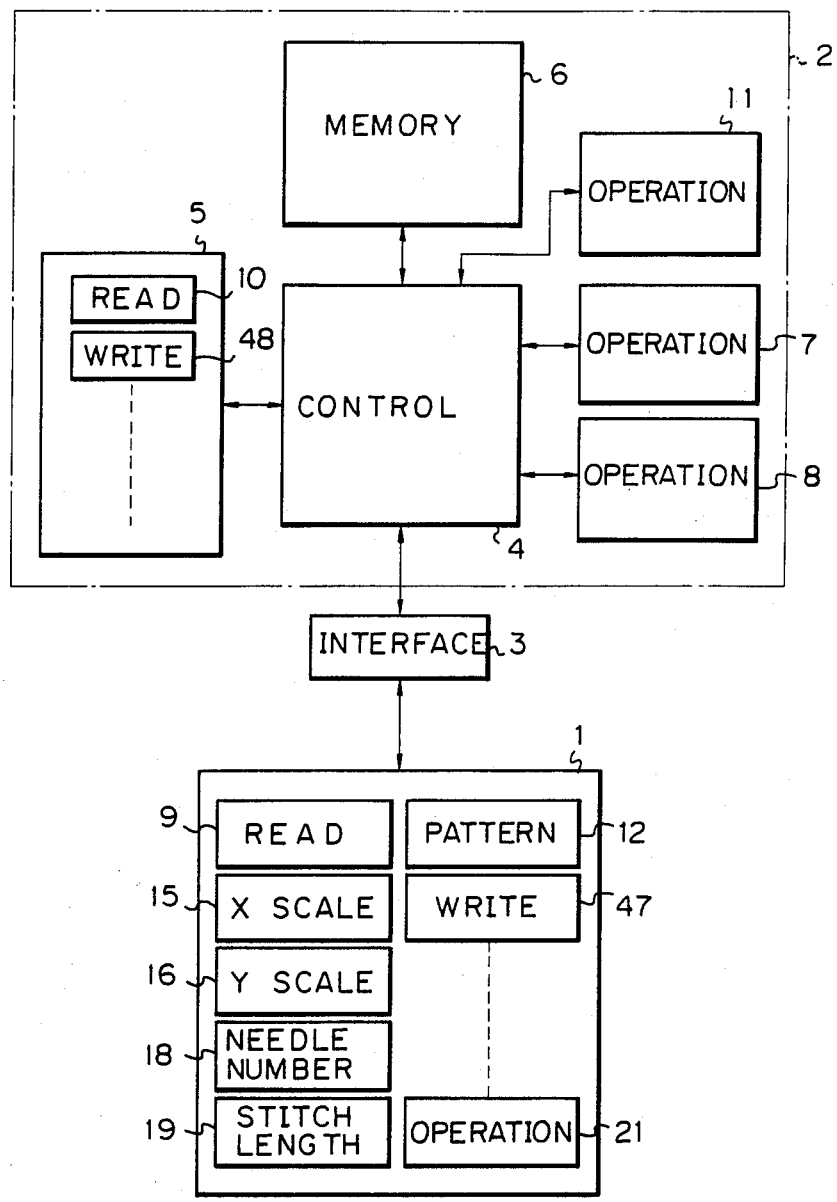
FIG. 1 is a block diagram of essential parts of an embodiment of the present invention.

One embodiment of the present invention will be described hereinafter with reference to the accompanying drawings. FIG. 1 is a block diagram illustrating essential parts of an embodiment of the present invention. The embodiment of FIG. 1 is mainly composed of a console 1 and a control portion 2. That is, the console 1 is connected to a control circuit 4 in the control portion 2 through an interface 3. The control circuit 4 preferably comprises a microprocessor. Also connected to the control circuit 4 are a read only memory circuit 5 in which various programs have been stored, a writable memory circuit 6 in which sewing patterns have been stored, and arithmetic logical circuits 7, 8 and 11.

Figure 2:
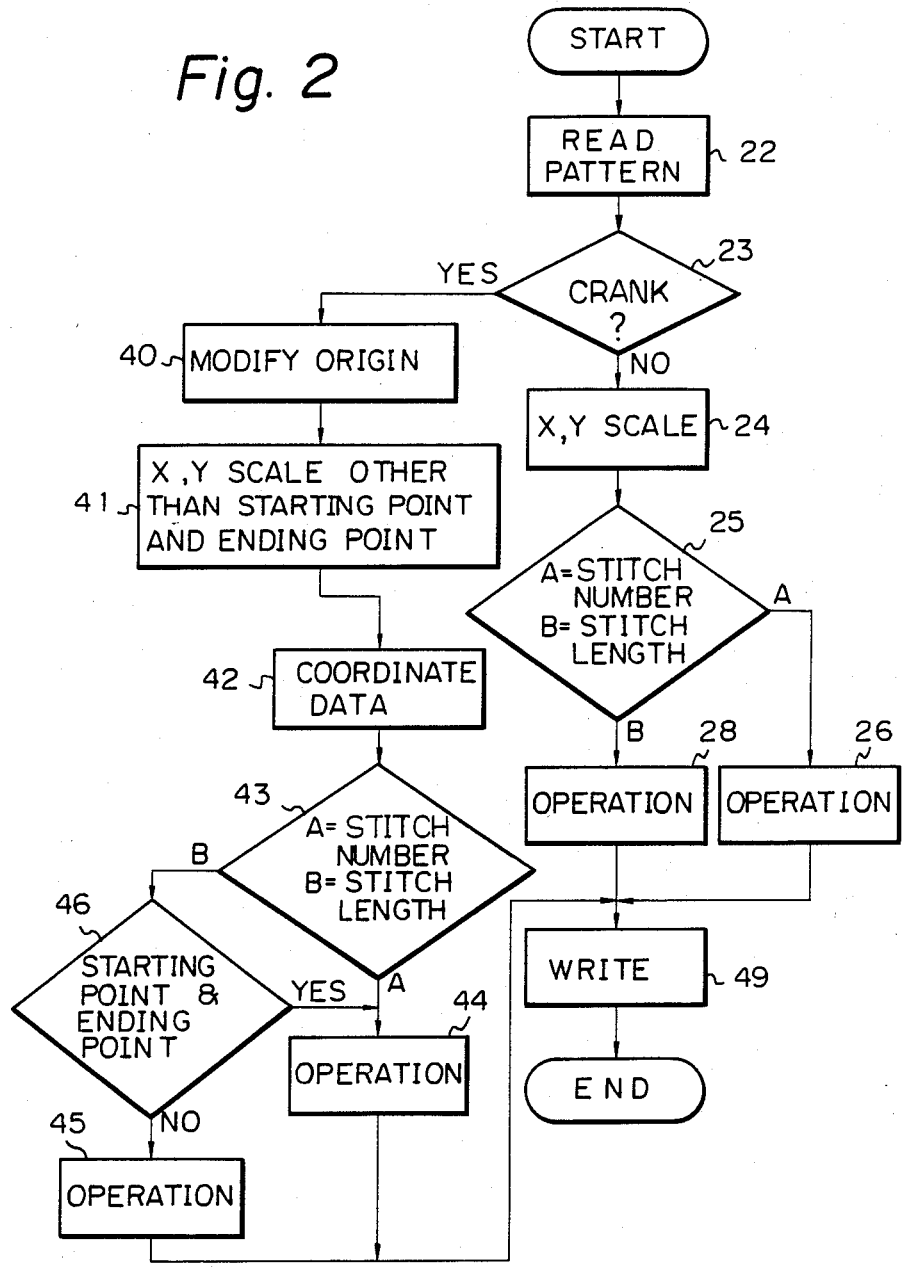
FIGS. 2 and 3 are flowcharts of the embodiment of FIG. 1.
Figure 3:
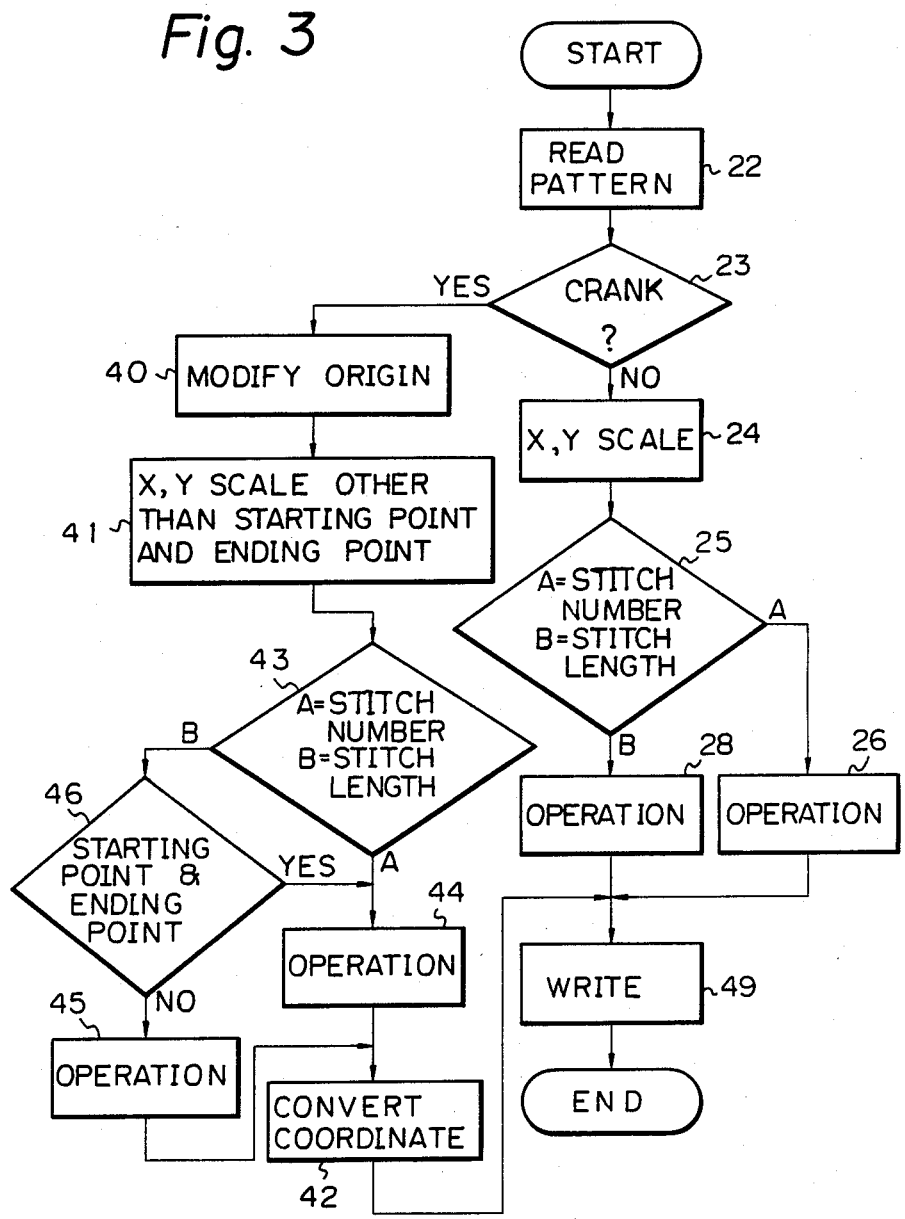

FIGS. 2 and 3 show flowcharts of the device of FIG. 1. FIG. 4, FIGS. 5(a) to 5(c) and FIG. 6 show the operation of the device of FIG. 1.

The operation making of sewing patterns similar to the original by an embodiment of the present invention having the above arrangement will be illustrated hereinafter. In operation, a read key 9 of the console 1 is operated. This causes the control circuit 4 to select a read mode 10 from the memory circuit 5. The control circuit 4 controls the operation in accordance with the program thus selected. A pattern number key 12 is then operated to input pattern number of an original sewing pattern 13 (FIGS. 4 and 6) on the basis of which similar sewing patterns will be prepared. An X multiplication key 15 and a Y multiplication key 16 are operated to input magnification scales in the X axis and Y axis directions of the original sewing pattern 13. A needle number variation key 18 is operated to increase or decrease the number of needles to be used in sewing or a sewing length variation key 19 is operated to increase or decrease the length of stitch to be sewn. Once the above operation is completed, an operation key 21 is operated. This causes the control circuit 4 to access the address of the memory circuit 6 corresponding to the pattern number and read the original sewing pattern 13.

Figures 4, 5A, 5B, 5C:
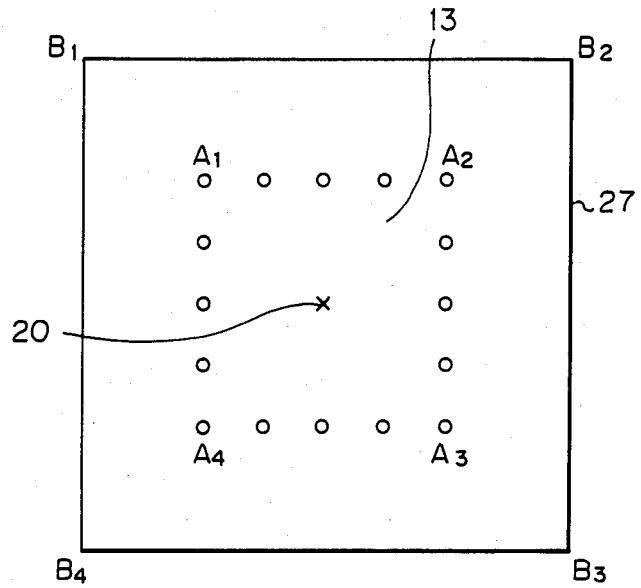
FIG. 4 FIGS. 5(a) to 5(c) and FIG. 6 are diagrams showing the operation of the embodiment of FIG. 1.

The operation of enlargement (or reduction) of sewing patterns without a work holder with a crank member will be described hereinafter with reference to FIG. 4, and FIGS. 5(a) to 5(c). Under this condition, the control circuit 4 determines from the data of the original sewing pattern 13 that the data does not use a work holder with a crank member (block 23 of FIG. 2). If the original sewing pattern 13 is not for a work holder with a crank member, the coordinate data of flexing points $A_1$, $A_2$, $A_3$ and $A_4$ of the original sewing pattern 13 are enlarged (or reduced) in accordance with the X multiplication scale and Y multiplication scale (block 24 of FIG. 2). The term "flexing point" as used herein is defined as follows. That is, a straight line is represented by one end and the other end thereof. An arc of a circle is represented by one end and the other end thereof and one point located along the arc therebetween. When points are imputted, the points themselves are inputted as flexing points. In this example, the X multiplication scale and the Y multiplication scale each is 2. Therefore, the coordinate data of the flexing points $A_1$, $A_2$, $A_3$ and $A_4$ are extended to $B_1$, $B_2$, $B_3$ and $B_4$, respectively, with the origin 20 as center of the pattern as shown in FIG. 4. It is then determined which is selected stitch number variation mode or sewing length variation mode (block 25 of FIG. 2). If stitch number variation mode is selected, the stitch length of the sewing pattern similar to the original sewing pattern 13 is equal to that of the original sewing pattern 13. Accordingly, the arithmetic logical circuit 7 performs the following operation (block 26 of FIG. 2) which will be described with reference to FIGS. 5(a) and 5(b). The distance between the flexing points $B_1$ and $B_2$ of the sewing pattern similar to the original sewing pattern is first calculated. The distance $B_1$ and $B_2$ is divided by the stitch length of the original sewing pattern 13 (hereinafter referred to as "stitch length C") to calculate the number of stitches to be used. If the number of stitches thus calculated is not an integer, fractions of 0.5 and over are counted as a unit and everything else is trunkcated to correct the number of stitches to be used between $B_1$ and $B_2$. The distance $B_1 - B_2$ is divided by the correct stitch number to calculate correct stitch length. The stitch length thus calculated is defined as a stitch length between $B_1$ and the next sewing point $b_0$. The coordinate data of the sewing point $b_0$ is calculated from the stitch length. Then, the distance $b_0 - B_2$ is calculated. The distance $b_0 - B_2$ is divided by the above correct stitch number less one. With the quotient as stitch length $b_0 - b_1$, the coordinate data of the sewing point $b_1$ is calculated. The coordinate data of the subsequent sewing points $b_2$ to $b_6$ are similarly calculated. The coordinate data of the final sewing point $B_2$ is calculated in accordance with the above X and Y multiplication scales. The coordinate data of other sewing points are similarly calculated. Thus, a sewing pattern 27 similar to the original pattern 13 is automatically prepared.

On the other hand, if stitch length variation mode has been inputted, stitch length variation mode is identified at block 25 of FIG. 2. If the stitch length variation is defined as twice the stitch length C of the original sewing pattern 13, the stitch length of the sewing pattern similar to the original sewing pattern 13 is twice that of the original sewing pattern 13. With this result, the arithmetic-logical circuit 8 performs the following operation (block 28 of FIG. 2) which will be described hereinafter with reference to FIGS. 5(a) and 5(c). The coordinate data of the flexing points $B_1$ and $B_2$ are first calculated in the same manner as described above. In order to determine the sewing point $b_0'$, the relative coordinate data between the flexing point $A_1$ and the next sewing point $a_0$ of the original sewing pattern 13 (movement from the point $A_1$ to the point $a_0$, i.e. $\Delta X_1$ and $\Delta Y_1$) are each doubled in accordance with the above stitch length variation data. In the present example, the relative coordinate data $\Delta Y_1$ of the sewing point $a_0$ is zero, and only the relative coordinate data $\Delta X_1$ is doubled. With these relative coordinate data ($2\Delta X_1$, 0) and the coordinate data of the flexing point $B_1$, the coordinate data of the next sewing point $b_0'$ is calculated. The coordinate data of the following sewing point $b_1'$ is similarly calculated in accordance with the coordinate data of the sewing point $b_0'$ and the relative coordinate data ($2\Delta X_2$, 0). The coordinate data of the sewing point $b_2'$ is similarly calculated. Finally, the coordinate data of the sewing point $B_2$ is defined as that of the flexing point $B_2$.

The operation for enlargement (or reduction) of sewing patterns with a work holder with reversion member will be described hereinafter with reference to FIG. 6.

Figure 6:
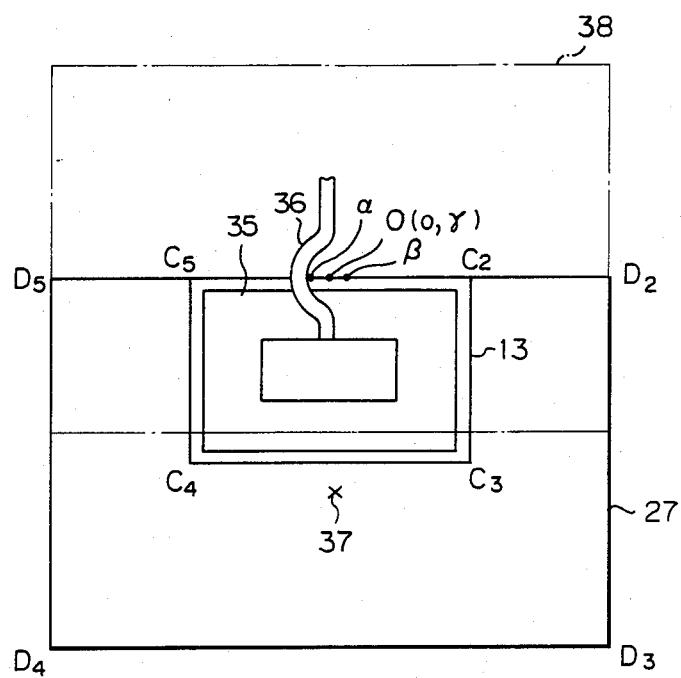

In a sewing machine having a work holder with a crank member as shown by reference number 35 in FIG. 6, the starting point $\alpha$ and the ending point $\beta$ of a sewing pattern must be positioned within the reversing area of the crank member 36. Therefore, if the coordinate data of the flexing points $C_2$ to $C_5$ of the original sewing pattern 13 are enlarged (or reduced) in the X and Y scales as described above with the origin 37 of the original sewing pattern 13 as center, the original sewing pattern 13 is enlarged as shown by reference number 38. Thus, the starting point $\alpha$ and the ending point $\beta$ are out of the reversing area of the crank member 36. This requires that the coordinate data of the starting point $\alpha$ and the ending point $\beta$ be left unmodified when a sewing pattern similar to the original is prepared.

Supposing now that the control circuit 4 determines that the above pattern is for a work holder with a crank member (block 23 of FIG. 2), the arithmetic logical circuit 11 performs the following operations. That is, the central point of the enlargement (or reduction) by the X and Y miltiplication scales is selected as the central point 0 of the crank or force transmitting member 36 of the work holder 35. The coordinate data of the point 0 has been previously stored with the point 37 as the origin (0, 0). In the present example, the point 0 has been stored as being (0, $\gamma$). Since the coordinate data (X, Y) of the flexing points $C_2$ to $C_5$ of the original sewing pattern 13 have been previously stored with the point 37 as the origin, they are each converted to the coordinate data calculated with the point 0 as the origin. That is, the operation (Y − $\gamma$) is performed for the Y coordinate data of the flexing points of the original sewing pattern 13 (block 40 of FIG. 2). At this time, the control circuit 4 identifies the coordinate data showing the first sewing point of the original sewing pattern 13 as the starting point $\alpha$ of sewing and the coordinate data showing the final sewing point of the original sewing pattern 13 as the ending point $\beta$ of sewing and prohibits the conversion of the coordinate data of these points $\alpha$ and $\beta$.

The operations by the X and Y multiplication scales are performed for the coordinate data of the flexing points $C_2$ to $C_5$ thus obtained (block 41 of FIG. 2). Also at this time, the control circuit 4 prohibits the operations on the starting point α of sewing and the ending point β of sewing. This causes the flexing points $C_2$ to $C_5$ to be extended to $D_2$ to $D_5$. Operations are then performed for the coordinate data $D_2$ to $D_5$ of the flexing points $D_2$ to $D_5$ thus obtained by multiplication such that they are converted to the coordinate data calculated with the point 37, with which the work holder with reversion the crank member is actually controlled, as the origin. That is, operations 2 $(Y-\gamma)+\gamma$ are performed so that $\gamma$ is added to the Y coordinate data of the flexing points 2 $(Y-\gamma)$ thus obtained by multiplication (block 42 of FIG. 2). As a result, the coordinate data of the flexing points $C_2$ to $C_5$ are multiplied to $D_2$ to $D_5$, respectively, as shown in FIG. 6 without changing the starting point α and the ending point β of sewing.

Under this condition, it is determined in the same manner as described above if stitch number variation mode or stitch length variation mode is selected (block 43 of FIG. 2). If stitch number variation mode is inputted, the coordinate data of the stitch points between the starting point α and the next flexing point $D_2$, between the flexing point $D_2$ and the flexing point $D_3$, between the flexing point $D_3$ and the flexing point $D_4$, between the flexing point $D_4$ and the flexing point $D_5$, which is immediately followed by the ending point β, and between the flexing point $D_5$ and the ending point are calculated in the same manner as used in the operations of block 26 to automatically prepare sewing pattern 27 similar to the original sewing pattern (block 44 of FIG. 2). At this time, the coordinate data of the starting point α and the ending point β are the same as that of the original sewing pattern 13.

On the other hand, if stitch length variation mode is inputted, the block 43 of FIG. 2 identifies the stitch length variation mode. Then, the same stitch length variation mode operations as described above are performed by the arithmetic logical circuit 8 in the same manner as used in the block 28 (block 45 of FIG. 2). During the operations, the control circuit 4 determines which the flexing point in question is in the range of between the starting point α and the next flexing point $D_2$ and between the flexing point $D_5$ and the ending point β, or the rest of the ranges (block 46 of FIG. 2). Supposing that the control circuit 4 determines the flexing point in question is in the former ranges, the same stitch number variation mode operations as shown in the block 26 are performed by the arithmetic logical circuit 7 using the starting point α and the flexing point $D_2$. Similarly, the control circuit 4 causes the stitch number variation mode operation to be performed by the arithmetic logical circuit 7 using the flexing point $D_5$ and the ending point β (block 44 of FIG. 2).

If a sewing pattern of the work holder with a crank member is enlarged (or reduced), operations as shown in FIG. 3 may be performed. That is, the operations as shown in the blocks 40 and 41 are performed to determine the flexing points $D_2$ to $D_5$ as obtained by multiplication in FIG. 6 (blocks 40 and 41 of FIG. 3). The same operations as performed in the blocks 43 to 46 of FIG. 2 are then performed for the coordinate data of the flexing points $D_2$ to $D_5$ with the point 0 as the origin (block 43 to 46 of FIG. 3). The coordinate data of the sewing pattern 27 similar to the original sewing pattern which has been obtained by multiplication with the point 0 as the origin are converted in the same manner as used in the block 42 of FIG. 2 to the coordinate data calculated with the point 37 as the origin (block 42 of FIG. 3).

Once the sewing pattern 27 similar to the original sewing pattern 13 is prepared, write key 47 is operated to select the write mode 48, and the pattern number key 12 is operated to determine the pattern number of the sewing pattern 27. Under this condition, the operation key 21 is operated. This causes the similar sewing pattern 13 to be stored as coordinate data in the address of the memory circuit 6 corresponding to the pattern number thus determined (block 49 of FIG. 2). In the present example, the memory circuit 6 comprises a floppy which is withdrawn from the input device and then set in the read portion of the sewing machine so that data stored therein are read.

Although the invention has been described in its preferred form with a certain degree of particularity, it is understood that the present disclosure of the preferred form has been changed in the details of construction and the combination and arrangement of parts may be restored to without departing from the spirit and the scope of the invention as hereinafter claimed.

What is claimed is:

1. An apparatus for a sewing machine which stores a sewing pattern to be sewn on a workpiece as sewing pattern data having at least a starting point, an ending point and flexing points of the sewing pattern as coordinates, said apparatus comprising:
   first means for reading out the sewing pattern;
   second means for indicating a magnification factor or reduction factor for enlarging or reducing the sewing pattern;
   third means for indicating stitch length variation mode or stitch number variation mode to the sewing pattern;
   fourth means for determining from the sewing pattern data read from said first means if the read sewing pattern is for use with a work holder having a crank member capable of reversing;
   fifth means for converting the coordinates of flexing points other than the starting point and ending point of the read sewing pattern into coordinates with a point within the reversing area of the crank member as the origin when said fourth means provides an indication;
   sixth means for enlarging or reducing the converted flexing points converted by said fifth means by the magnification factor or a reduction factor indicated by said second means;
   seventh means for converting the enlarged or reduced coordinates of the flexing points by said sixth means into coordinates with the origin of the read sewing pattern as the origin; and
   eighth means for dividing the distance between the flexing points and the distance between the starting point and the subsequent flexing point and the distance between the ending point and the flexing point immediately preceding the ending point by the stitch length of said read sewing pattern and for rounding a resulting quotient and for calculating coordinates of stitch points between the flexing points and between the starting point and the subsequent flexing point and between the ending point and the flexing point immediately preceding the ending point in accordance with the integer obtained when said third means indicates stitch number variation mode and for calculating coordinates of stitch points between the starting point and the subsequent flexing point and between the flexing point immediately preceding the ending point and ending point in accordance with the integer obtained and for calculating the coordinates of stitch points between the flexing points other than the regions in accordance with the relative coordinates of each of the stitch points of the read sewing pattern corresponding to the stitch points of the calculated sewing pattern and value of the stitch length variation indication when said third means indicates stitch length variation mode.

2. An apparatus for a sewing machine which stores a sewing pattern to be sewn on a workpiece as sewing pattern data having at least a starting point, an ending point and flexing points of the sewing pattern as coordinates, said apparatus comprising:

first means for reading out the sewing pattern;

second means for indicating a magnification factor or reduction factor for enlarging or reducing the sewing pattern;

third means for indicating stitch length variation mode or stitch number variation mode to the sewing pattern;

fourth means for determining from the sewing pattern data read from said first means if the read sewing pattern is for use with a work holder having a crank member capable of reversing;

fifth means for converting the coordinates of the flexing points other than the starting point and ending point of the read sewing pattern into coordinates with a point within the reversing area of the crank member as the origin when said fourth means provides an indication;

sixth means for enlarging or reducing the converted flexing points by said fifth means by the magnification factor or reduction factor indicated by said second means;

seventh means for dividing the distance between the flexing points and the distance between the starting point and the subsequent flexing point and the distance between the ending point and the flexing point immediately preceding the ending point by the stitch length of said read sewing pattern and for rounding a resulting quotient and for calculating coordinates of stitch points between the flexing points and between the starting point and the subsequent flexing point and between the ending point and the flexing point immediately preceding the ending point in accordance with the integer obtained when said third means indicates stitch number variation mode and for calculating coordinates of stitch points between the starting point and the subsequent flexing point and between the flexing point immediately preceding the ending point by the stitch length of said read sewing pattern and for rounding a resulting quotient and for calculating coordinates of stitch points between the starting point and the subsequent flexing point and between the flexing point immediately preceding the ending point and ending point in accordance with the integer obtained and for calculating the coordinates of stitch points between the flexing points other than the regions in accordance with the relative coordinates of each of the stitch points of said read sewing pattern corresponding to the stitch points of the calculated sewing pattern and a value of the stitch length variation when said third means indicates stitch length variation mode; and eighth means for converting the coordinates from said seventh means into coordinates with the origin of the read sewing pattern by said first means as the origin.

3. An apparatus for a sewing machine having a work holder with a crank member which is pivotably movable about a longitudinal axis of the crank member and which stores a sewing pattern to be sewn on a workpiece as sewing pattern data having at least a starting point, an ending point and flexing points of the sewing pattern as coordinates, said apparatus comprising:

first means for reading the sewing pattern;

second means for reading a scaling factor for the sewing pattern;

third means for determining from the sewing pattern data read from said first means if the sewing pattern is for use with a work holder having a pivotable crank member;

fourth means for converting the coordinates of only flexing points into coordinates with a point within the area in which the crank member pivots as the origin when said third means indicates that the sewing pattern is to be used with a work holder having a pivotable crank; and fifth means for scaling the converted flexing points by said fourth means by the scaling factor read by said second means.

4. An apparatus as set forth in claim 3 further including sixth means for converting the scaled coordinates of the flexing points by said fifth means into coordinates with the origin of the sewing pattern read from said first means as the origin.

5. An apparatus as set forth in claim 3 further including seventh means for indicating stitch length variation mode or stitch number variation mode to the sewing pattern.

6. An apparatus as set forth in claim 5 further including means for dividing the distance between the flexing points and the distance between the starting point and the subsequent flexing point and the distance between the ending point and the flexing point immediately preceding the ending point by the stitch length of said read sewing pattern and for rounding a resulting quotient and for calculating coordinates of stitch points between the flexing points and between the starting point and the subsequent flexing point and between the ending point and the flexing point immediately preceding the ending point in accordance with integer obtained when said seventh means indicates stitch number variation mode and for calculating coordinates of stitch points between the starting point and the subsequent flexing point and between the flexing point immediately preceding the ending point and ending point in accordance with the integer obtained and for calculating the coordinates of stitch points between the flexing points other than the regions in accordance with the relative coordinates of each of the stitch points of said read sewing pattern corresponding to the stitch points of the calculated sewing pattern and a value of the stitch length variation when said seventh means indicates stitch length variation mode.

* * * * *